United States Patent [19]

Drop, Sr.

[11] 4,240,721
[45] Dec. 23, 1980

[54] COOKING WITH RECIPES THROUGH IMPROVED VIEWING MACHINE OR WALL SCREEN PROJECTION

[76] Inventor: Paul A. Drop, Sr., 16850 Alcross, Covina, Calif. 91722

[21] Appl. No.: 31,617

[22] Filed: Apr. 19, 1979

[51] Int. Cl.³ .................. G03B 21/10; G03B 21/58
[52] U.S. Cl. ........................... 353/74; 353/119; 353/76 JZ
[58] Field of Search ............... 35/35 B; 353/119, 43, 353/74

[56] References Cited

U.S. PATENT DOCUMENTS

| | | | |
|---|---|---|---|
| 2,360,662 | 10/1944 | Eddy | 353/65 |
| 2,592,444 | 4/1952 | Matelena | 353/74 X |
| 2,614,457 | 10/1952 | Weber | 353/119 |
| 3,100,420 | 8/1963 | Kuhn | 353/43 |
| 3,544,208 | 12/1970 | Wasson | 353/119 X |
| 3,586,432 | 6/1971 | Pentes | 353/74 |
| 3,998,535 | 12/1976 | Clarke | 353/DIG. 5 |
| 4,030,814 | 6/1977 | Clifton | 350/239 X |

*Primary Examiner*—Harry N. Haroian

[57] ABSTRACT

A projector into which are placed slides having various cooking recipes imprinted thereupon, and the invention including a screen, upon which the recipe is projected greatly enlarged, so that a homemaker can more easily see the enlarged text, while making a food preparation.

2 Claims, 5 Drawing Figures

U.S. Patent
Dec. 23, 1980
4,240,721
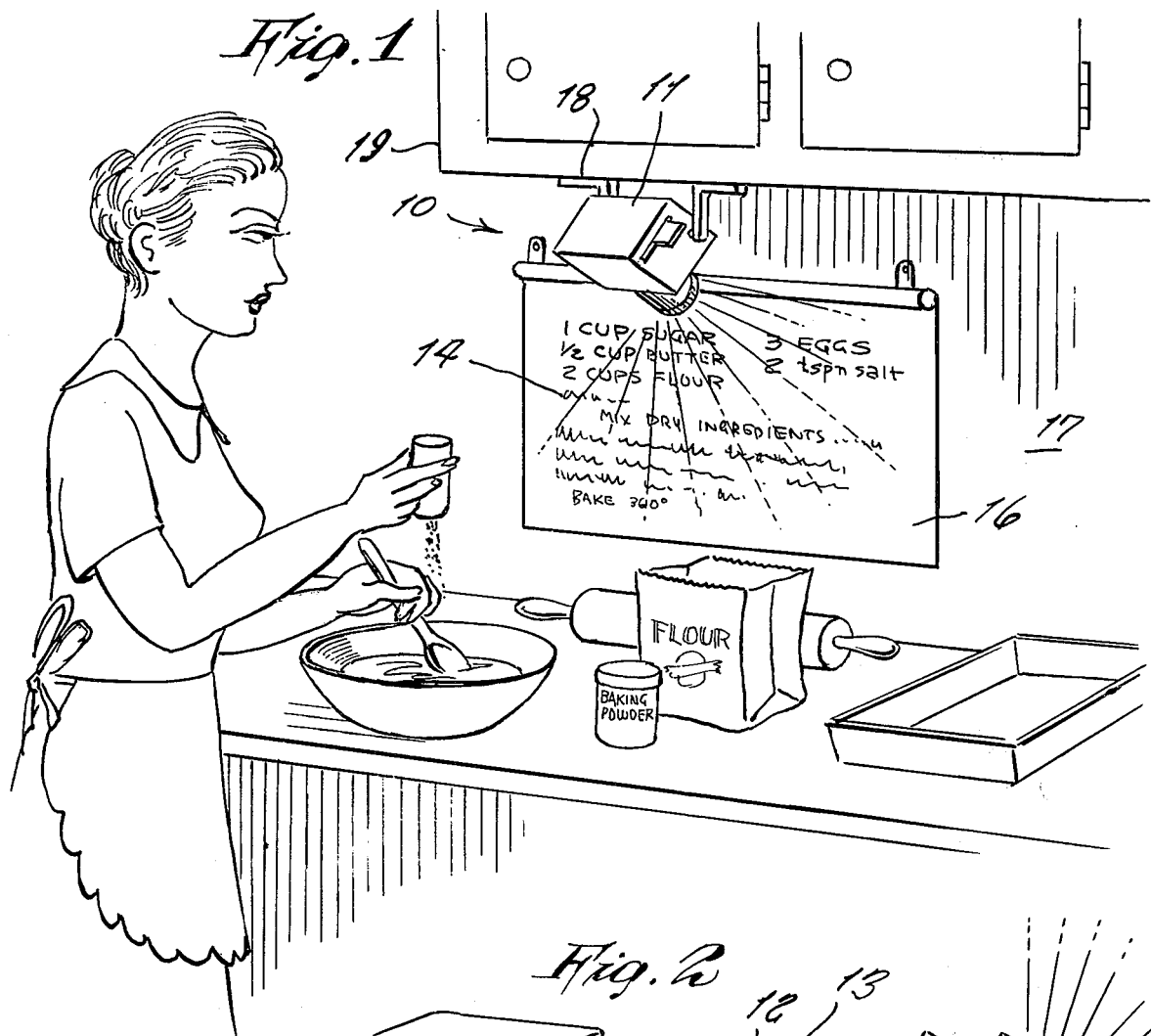
Fig. 1
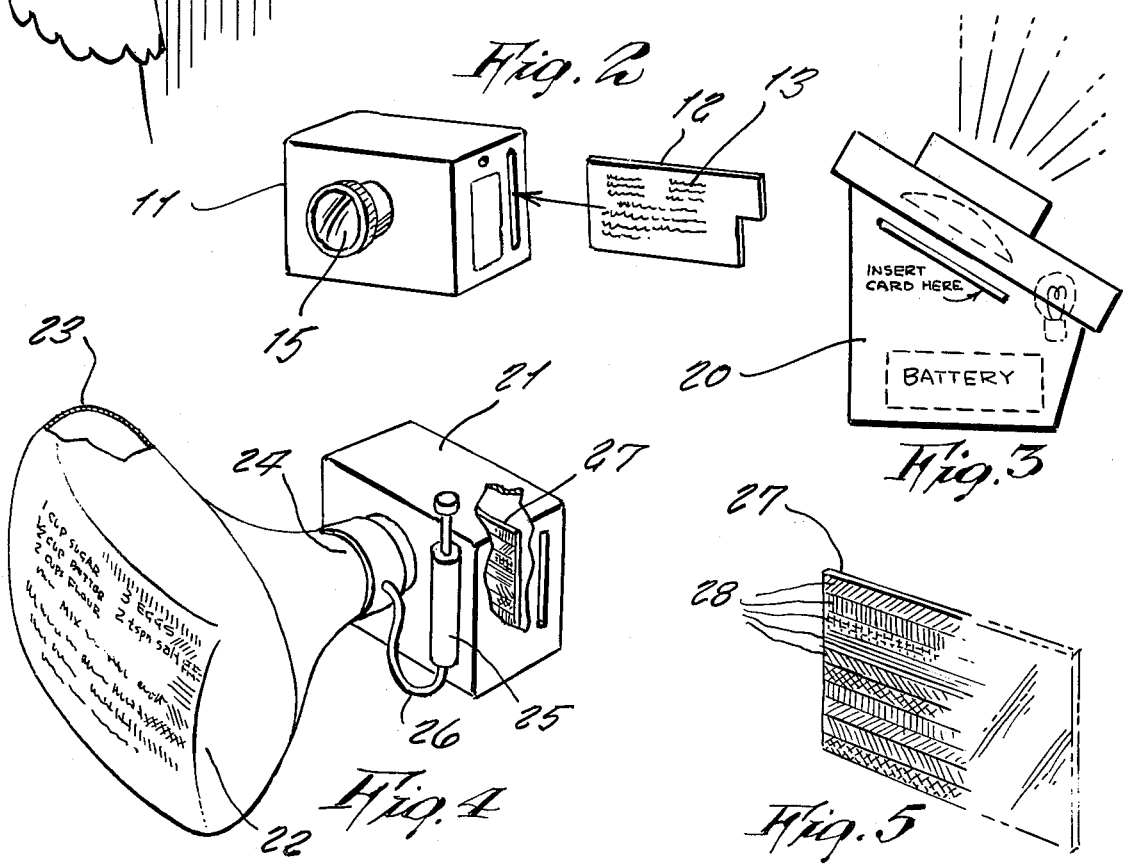
Fig. 2
Fig. 3
Fig. 4
Fig. 5

COOKING WITH RECIPES THROUGH IMPROVED VIEWING MACHINE OR WALL SCREEN PROJECTION

SPECIFICATION

This invention relates generally to cooking recipe devices.

It is well known, that when a person follows a recipe in a cookbook, there is always a danger of spilling cooking ingredients thereupon, defacing the printed page, because the book is usually placed upon the cabinet counter, where the work is being done, so as to be handy. This is objectionable, and is, therefore, in need of an improvement.

Accordingly, it is a principal object of the present invention to provide a means whereby a cooking recipe is projected upon a screen, that can be hung on a wall, where it is out of the way, so as not to become soiled from cooking ingredients, while preparing a food.

Another object is to provide a recipe projector and viewing screen, which will eliminate the need to squint at fine printing in a book, or to take time out for looking at it while preparing the food, because the enlarged projection can be easily seen right from where a person is working.

Yet another object is to provide a recipe projector, wherein the enlarged viewing screen is alternately mounted directly on the projector.

Yet a further object is to provide a recipe projector, wherein the image on the screen is color tinted in horizontal bars, so that a printed text is still more easy to follow from one line to another.

Other objects are to provide a means of cooking with recipes projected on a screen, which is simple in design, inexpensive to manufacture, rugged in construction, easy to use and efficient in operation.

These, and other objects, will be readily evident, upon a study of the following specification, and the accompanying drawing, wherein:

FIG. 1 is a perspective view of the invention, shown in operative use, with projector, under a front edge of a kitchen wall cabinet, projecting a recipe image on a screen mounted on a wall;

FIG. 2 is a perspective view of the projector, and a recipe card fitted therein;

FIG. 3 is a side view of another design of the projector;

FIG. 4 is a perspective view of still another design of projector, which incorporates its own enlarged viewing screen, and FIG. 5 is a perspective view of a color-projecting component thereof.

Referring now to the drawing in greater detail, and more particularly, to FIGS. 1 and 2 thereof at this time, the reference numeral 10 represents an assembly, according to the present invention, wherein there is a projector 11, into which a slide 12 is receivable, the slide being imprinted with a cooking recipe 13. The projector contains an electric lamp, for projecting an image 14 of the recipe through a lens 15, and upon a screen 16, that can be mounted on a wall 17. The projector may be battery operated, or connected, by an extension cord, to a household electric outlet socket. The projector is fitted into a bracket 18, mountable under a forward edge of a wall-mounted, kitchen cabinet 19. Thus, both the projector and screen are out of the way, so that a kitchen cabinet counter is completely clear for doing the work. A person needs only to look up from the work, and see the recipe instructions.

In FIG. 3, another design of projector 20 is shown, which projects the image angularly upwardly, and so could be stationed somewhere upon a counter, projecting it at a wall screen.

In FIGS. 4 and 5, another design of projector 21 includes its own screen 22 attached thereto. The screen comprises an inflatable rubber balloon 23, similar to such as children play with, and a mouth of neck 24 of the balloon is fitted around the projector lens, so that the image is projected on the balloon's interior front wall, the balloon material being translucent, so that the image is visible from the outer side. A hand operated air pump 25, mounted on the projector, is connected by a hose 26 to the neck 24, inflated to any desired size, and have as large a viewing image as desired. When not used, the balloon is allowed to deflate, so as not to take up a large space.

A transparent plate 27, inside the projector is tinted in different colors of horizontal bars 28, and the recipe image passes therethrough, so that the colored bar images aid a person to read more readily from one line to another, similarly to an underlined text, and wherein a person will more quickly find a particular line when she remembers it is projected in a specific color.

While various changes may be made in the detail construction, it is understood that such changes will be within the spirit and scope of the present invention, as is defined by the appended claims.

What I now claim is:

1. A means of cooking with projected recipes, comprising, in combination, a projector containing a lamp therewithin, a lens opening at its front fitted with a lens, a slide receivable in said projector, a recipe printed on said slide, so that light rays from said lamp project an image of said recipe outwardly of said lens, and a screen upon which said image is projected; said screen comprising an inflatable transluscent balloon having a neck portion mounted around said lens, and a hand-operated air pump mounted on said projector, said air pump being connected by a hose to said neck portion of said balloon, for selective size of inflation of said balloon and said image thereupon.

2. The combination as set forth in claim 1, wherein a transparent plate tinted in different horizontal colors intercepts said image.

* * * * *